(12) United States Patent
Otsuka et al.

(10) Patent No.: US 10,042,686 B2
(45) Date of Patent: Aug. 7, 2018

(54) DETERMINATION METHOD, SELECTION METHOD, AND DETERMINATION DEVICE

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 14/831,161

(22) Filed: Aug. 20, 2015

(65) Prior Publication Data
US 2016/0092289 A1 Mar. 31, 2016

(30) Foreign Application Priority Data
Sep. 30, 2014 (JP) .................................. 2014-201501

(51) Int. Cl.
*G06F 11/00* (2006.01)
*G06F 11/07* (2006.01)

(52) U.S. Cl.
CPC ...... *G06F 11/0751* (2013.01); *G06F 11/0709* (2013.01)

(58) Field of Classification Search
CPC .............. G05B 23/024; G06F 11/0751; G06F 11/0793; G06F 11/3006; G06F 11/3058;
(Continued)

(56) References Cited

U.S. PATENT DOCUMENTS 5,197,148 A * 3/1993 Blount .................... G06F 9/466
700/79
5,483,637 A * 1/1996 Winokur ............. H04L 12/2602
714/26
(Continued)

FOREIGN PATENT DOCUMENTS

JP 2009/144825 12/2002
JP 2004-348740 12/2004
(Continued)

OTHER PUBLICATIONS

Japanese Office Action dated Jun. 5, 2018 from Japanese Patent No. 2014-201501, 7 pages.

*Primary Examiner* — Bryce P Bonzo
*Assistant Examiner* — Jeison C Arcos
(74) *Attorney, Agent, or Firm* — Staas & Halsey LLP

(57) ABSTRACT

A determination method, for determining a possibility of a new failure in a system, includes: obtaining first setting values for a plurality of setting items of the system when a failure in the system occurs; obtaining second setting values for the plurality of setting items when an input that the failure has been recovered is received; identifying at least one setting item from among the plurality of setting items based on the first setting values and the second setting values, the at least one setting item having a first setting value different from a second setting value; determining a value from among the first value and the second value of the at least one setting item; comparing an input value regarding the at least one setting item and the value; determining the possibility based on a result of the comparing; and outputting information regarding the possibility.

12 Claims, 18 Drawing Sheets

(58) Field of Classification Search
CPC .............. G06F 11/0709; H04L 41/069; H04L 41/0853; H04L 41/22
See application file for complete search history.

(56) References Cited

U.S. PATENT DOCUMENTS

| | | | | |
|---|---|---|---|---|
| 5,790,777 | A * | 8/1998 | Izuta | G06F 11/0724 714/45 |
| 6,023,507 | A * | 2/2000 | Wookey | G06F 11/2294 380/285 |
| 6,738,811 | B1 * | 5/2004 | Liang | H04L 41/147 709/224 |
| 7,386,839 | B1 * | 6/2008 | Golender | G06F 11/3636 717/127 |
| 2003/0145083 | A1 * | 7/2003 | Cush | G06F 11/0709 709/224 |
| 2005/0125710 | A1 | 6/2005 | Sanghvi | |
| 2006/0149408 | A1 * | 7/2006 | Speeter | G06F 8/71 700/126 |
| 2006/0242286 | A1 * | 10/2006 | Hawkins | G06F 11/0709 709/223 |
| 2010/0318856 | A1 * | 12/2010 | Yoshida | G05B 23/024 714/47.1 |
| 2011/0072305 | A1 | 3/2011 | Matsubara et al. | |
| 2012/0166879 | A1 * | 6/2012 | Watanabe | G06F 11/0751 714/37 |
| 2012/0266020 | A1 * | 10/2012 | Souvannarath | G06F 11/0709 714/26 |
| 2014/0019795 | A1 * | 1/2014 | Sonoda | G06F 11/0751 714/2 |
| 2014/0143625 | A1 * | 5/2014 | Watanabe | G06F 11/008 714/741 |

FOREIGN PATENT DOCUMENTS

| | | |
|---|---|---|
| JP | 2007-52756 | 3/2007 |
| JP | 2011-2906 | 1/2011 |
| JP | 2014-102661 | 6/2014 |

* cited by examiner

FIG. 6

| KEY | 38 |
|---|---|
| /etc/my.cnf:port |
| /etc/resolv.conf:nameserver |
| /proc/sys/kernel/random/entropy_avail |

FIG. 7

| FAILURE TYPE | KEY | VALUE $V_A$ | VALUE $V_B$ |
|---|---|---|---|
| F001 | /etc/my.cnf:port | 3306 | 3309 |
| F002 | /proc/sys/kernel/random/entropy_avail | 100 | 150 |

FIG. 8

| FAILURE TYPE | KEY |
|---|---|
| F001 | /proc/sys/kernel/random/entropy_avail |
|  |  |

| FAILURE TYPE | KEY | SUCCESS OR FAILURE | VALUE | THE NUMBER OF TIMES |
|---|---|---|---|---|
| F001 | /etc/my.cnf:port | FAILURE | 3306 | 1 |
| F001 | /etc/my.cnf:port | FAILURE | 3307 | 1 |
| F001 | /etc/my.cnf:port | FAILURE | 3308 | 1 |
| F001 | /etc/my.cnf:port | SUCCESS | 3309 | 3 |
| F002 | /etc/resolv.conf:nameserver | SUCCESS | 192.168.0.1 | 2 |
| F002 | /etc/resolv.conf:nameserver | FAILURE | 192.168.0.2 | 1 |
| F002 | /etc/resolv.conf:nameserver | FAILURE | 192.16.0.1 | 1 |

FIG. 10

| FAILURE TYPE | KEY | THE NUMBER OF TIMES $N_S$ | THE NUMBER OF TIMES $N_F$ |
|---|---|---|---|
| F001 | /etc/my.cnf:port | 3 | 3 |
| F002 | /etc/resolv.conf:nameserver | 2 | 2 |

FIG. 11

| FAILURE TYPE | KEY | SPECIFIC SCORE $S_S$ | SPECIFIC SCORE $S_F$ |
|---|---|---|---|
| F001 | /etc/my.cnf:port | 0 | 0.48 |

| FAILURE TYPE | KEY | VALUE | DETECTION SCORE |
|---|---|---|---|
| F001 | /etc/my.cnf:port | 3306 | −1.0 |

41

DETERMINATION METHOD, SELECTION METHOD, AND DETERMINATION DEVICE

CROSS-REFERENCE TO RELATED APPLICATION

This application is based upon and claims the benefit of priority of the prior Japanese Patent Application No. 2014-201501, filed on Sep. 30, 2014, the entire contents of which are incorporated herein by reference.

FIELD

The embodiments discussed herein are related to a technique for determining whether there have been signs of failure occurrence or not.

BACKGROUND

To date, services have been provided in which a system operated by a user side is monitored, and if a sign of failure occurrence in the system is detected, a notification is sent to a system administrator, or the like of the user side that the sign of failure occurrence has been detected.

For example, as a method of monitoring processes, a proposal is made of a method including a step of generating a signature representing a process, a step of continuously updating the generated signature, and a step of detecting abnormality based on the continuously updated signature. Related-art technique is disclosed in Japanese Laid-open Patent Publication No. 2004-348740, for example.

Also, for a system including at least one processor, and one software application, a proposal is made of a system of monitoring collected diagnostic data in order to automatically make a diagnosis on a wireless device by a processor. In this system, problem patterns that have occurred up to now are learned in order to improve the diagnostic ability on all the problems. Related-art technique is disclosed in Japanese Laid-open Patent Publication No. 2007-052756, for example.

SUMMARY

According to an aspect of the invention, a determination method executed by a computer for determining a possibility of a new failure in a system, the determination method includes: obtaining first setting values set for a plurality of setting items of the system when a failure in the system occurs; obtaining second setting values set for the plurality of setting items when an input that the failure has been recovered is received; identifying at least one setting item from among the plurality of setting items based on the first setting values and the second setting values, the at least one setting item having a first setting value different from a second setting value; determining a value from among the first value and the second value of the at least one setting item, the value being used for the determining of the possibility; comparing an input value regarding the at least one setting item and the value; determining the possibility based on a result of the comparing; and outputting information regarding the possibility.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a key list;

FIG. 7 is a diagram illustrating an example of a pattern list;

FIG. 8 is a diagram illustrating an example of a disregard list;

FIG. 9 is a diagram illustrating an example of a learning data database;

FIG. 10 is a diagram illustrating an example of a count data database;

FIG. 11 is a diagram illustrating an example of a specific score database;

FIG. 12 is a diagram illustrating an example of a sign detection result list;

DESCRIPTION OF EMBODIMENTS

One of the causes of the occurrence of a failure in a system is an error in setting values for various setting items in the configuration information that defines a system configuration. Further, a setting error derives from the case of setting an erroneous value, and the case of omission of changing a value that has to be changed. When a failure occurs in a system, it is possible for a user to assume that a setting value is erroneous. However, if omission of changing a value is the cause of failure occurrence, it is difficult for the user to estimate the cause of the failure, and to determine detection of a sign of failure occurrence.

With related-art techniques, detection and learning of a failure are performed using information before and after the occurrence of a failure. However, in this case, it is difficult to detect a failure occurrence that is caused by omission of changing a value.

Also, when a failure occurs in a system, and its recovery work is carried out, the configuration information before the failure recovery and the configuration information after the failure recovery are compared so that a setting item of the configuration information related to the failure is identified. Thus, the configuration information is stored for a certain period, and learning is performed with a setting item value that was changed before and after the failure recovery as information on the setting change item. Then, it is thought that a sign of failure occurrence is detected based on the comparison between a value set in the setting items of newly input configuration information, and the setting change item information. However, it is difficult to identify which one of the values before and after the failure recovery is to be used as suitable setting change item information depending on a failure type and a difference in the setting items, and the like.

According to an embodiment of the disclosed technique, it is desirable to identify information on setting change items suitable for detecting a sign of failure occurrence.

In the following, a detailed description will be given of an example of an embodiment according to the present disclosure with reference to the drawings.

Figure 1:
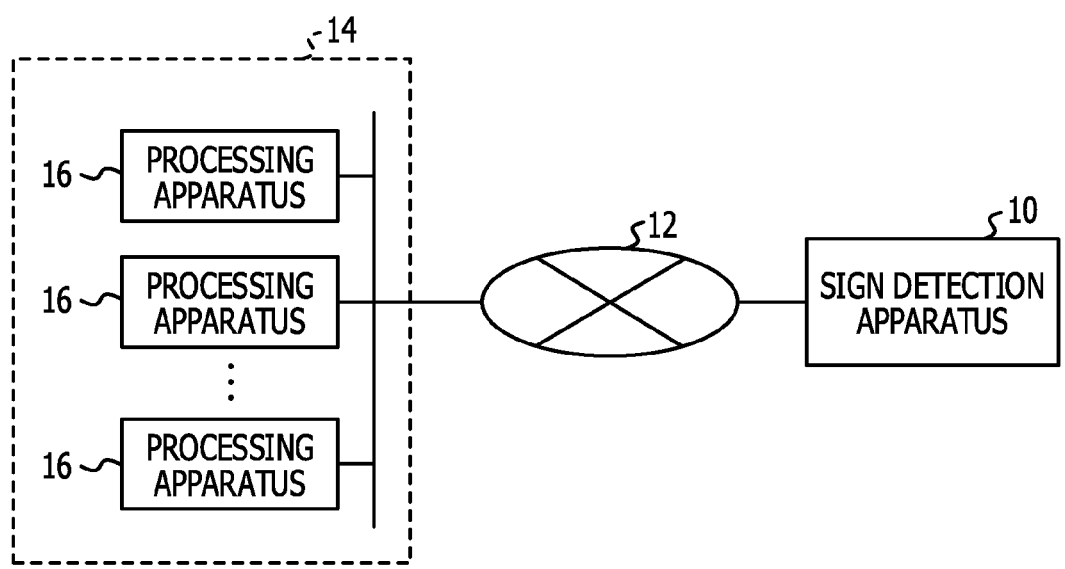
FIG. 1 is a schematic diagram illustrating a system configuration including a sign detection apparatus according to the present embodiment.

As illustrated in FIG. 1, a sign detection apparatus 10 according to the present embodiment is connected to a processing system 14 including a plurality of processing apparatuses 16 through a network 12, such as the Internet, or the like. The sign detection apparatus 10 monitors each of the processing apparatuses 16, and detects a sign of failure occurrence in each of the processing apparatuses 16.

It is possible to detect a sign of failure occurrence in one of the processing apparatuses 16 by determining whether correct values are set or not for the setting values of the various setting items in the configuration information (the details will be described later) in the processing apparatus 16, for example. For a method of determining whether the set value is correct or not, an assumption is made of a method of comparing the set value with correct learning data, or erroneous learning data, which are provided in advance. When the set value and a value of the correct learning data are compared, it is possible to determine that the set value is correct if the two values match. When the set value and a value of the erroneous learning data are compared, it is possible that the set value is incorrect if the two values match.

However, there are two causes of failure occurrence in the processing apparatus 16. One of the causes is the case of setting erroneous data for each one of the setting items of the configuration information, and the other of the causes is the case of omission of changing the value that has to be changed. In this manner, there are differences in the causes of failure occurrence, and thus it is difficult to determine which one of correct learning data or erroneous learning data is to be compared with the set value in order to make it possible to carry out more suitable sign detection.

For example, in the case where a setting item value having a predetermined initial value has to be changed to be a suitable value for each of the processing apparatuses 16, if there is omission of changing the value, the setting item value remains the initial value, and thus this becomes a cause of failure occurrence. In this case, there is a possibility that a correct setting value is different for each of the processing apparatuses 16, and thus it is not easy to prepare correct learning data that cover all of these values. In this case, learning data that indicates an error if the initial value is set ought to be provided, and it is possible to more suitably detect a sign of failure occurrence by comparing the erroneous learning data and the set value.

Thus, in the sign detection apparatus 10 according to the present embodiment, both correct learning data, and erroneous learning data for comparing with the set value are provided, and learning data that allows more suitable detection of a sign of failure occurrence is identified and used.

Also, when a sign of failure occurrence is detected by comparing the values of before and after a configuration information change, it is not possible to detect a case where omission of change of setting values causes failure occurrence. This is because there is no change if the values of before and after a configuration information change are compared. In the present embodiment, correct learning data and erroneous learning data are generated from the configuration information of before and after a failure recovery, and a comparison is made between the learning data and the set values so that the set value is determined to be correct or not.

Figure 2:
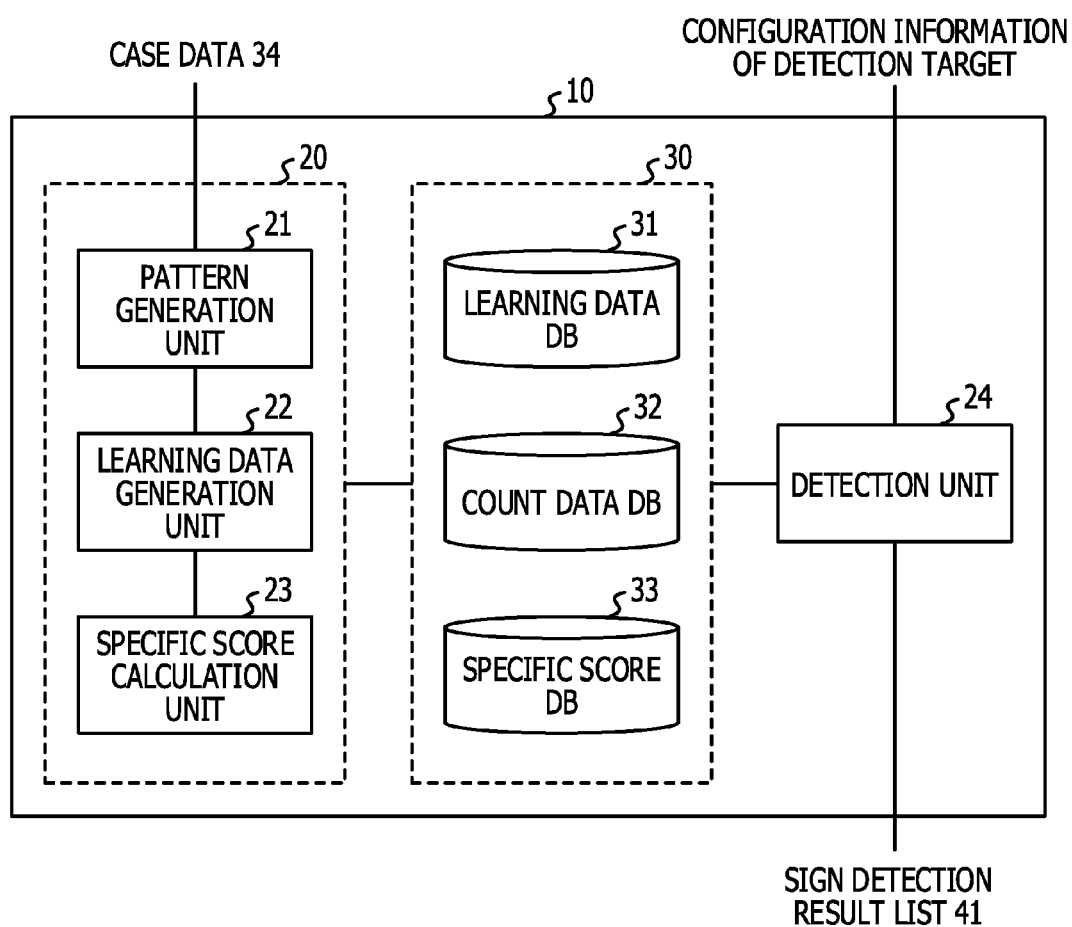
FIG. 2 is a functional block diagram of the sign detection apparatus according to the present embodiment.

FIG. 2 illustrates a functional block diagram of the sign detection apparatus 10. As illustrated in FIG. 2, the sign detection apparatus 10 includes a learning unit 20 including a pattern generation unit 21, a learning data generation unit 22, and a specific score calculation unit 23, and a detection unit 24. Also, a storage unit 30 stores a learning data database (DB) 31, a count data DB 32, and a specific score DB 33. Descriptions will been given later of the individual databases. In this regard, the learning unit 20 is an example of a sign detection support apparatus according to the present disclosure. The pattern generation unit 21 is an example of a storage unit and an extraction unit according to the present disclosure. Also, the learning data generation unit 22 and the specific score calculation unit 23 are examples of specification units according to the present disclosure.

Figure 3:
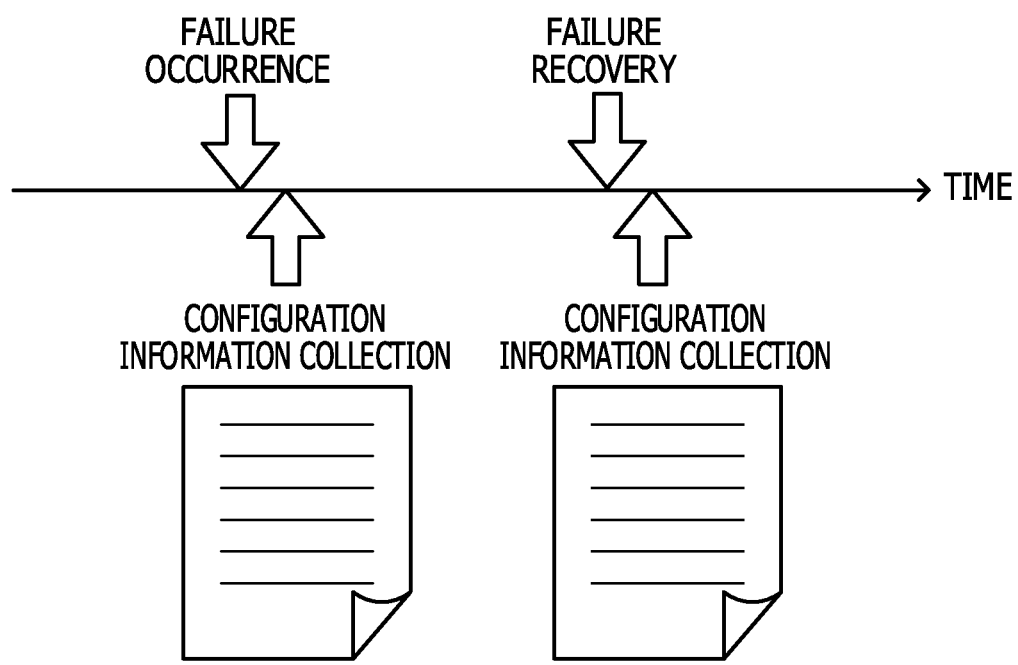
FIG. 3 is an explanatory diagram illustrating a relationship between the occurrence of a failure and recovery, and collection of configuration information.

Here, as illustrated in FIG. 3, when a failure occurs in the processing apparatus 16, configuration information is collected immediately after the failure occurrence in order to confirm the state at the time of the failure occurrence. Then, after the failure is recovered, the configuration information is collected in order to record the recovery work and confirm the operation, and the like. A pair of the configuration information that is collected before and after the failure recovery is input into the sign detection apparatus 10 as case data. In this regard, the configuration information is information indicating the hardware configuration of the processing apparatus 16, and the software configuration of the operating system (OS), the applications, and the like that are installed in the processing apparatus 16. The configuration information is, for example data of the directory structure, which is the information extracted on the configuration from the file system of the processing apparatus 16 using a known dedicated tool.

Figure 4:
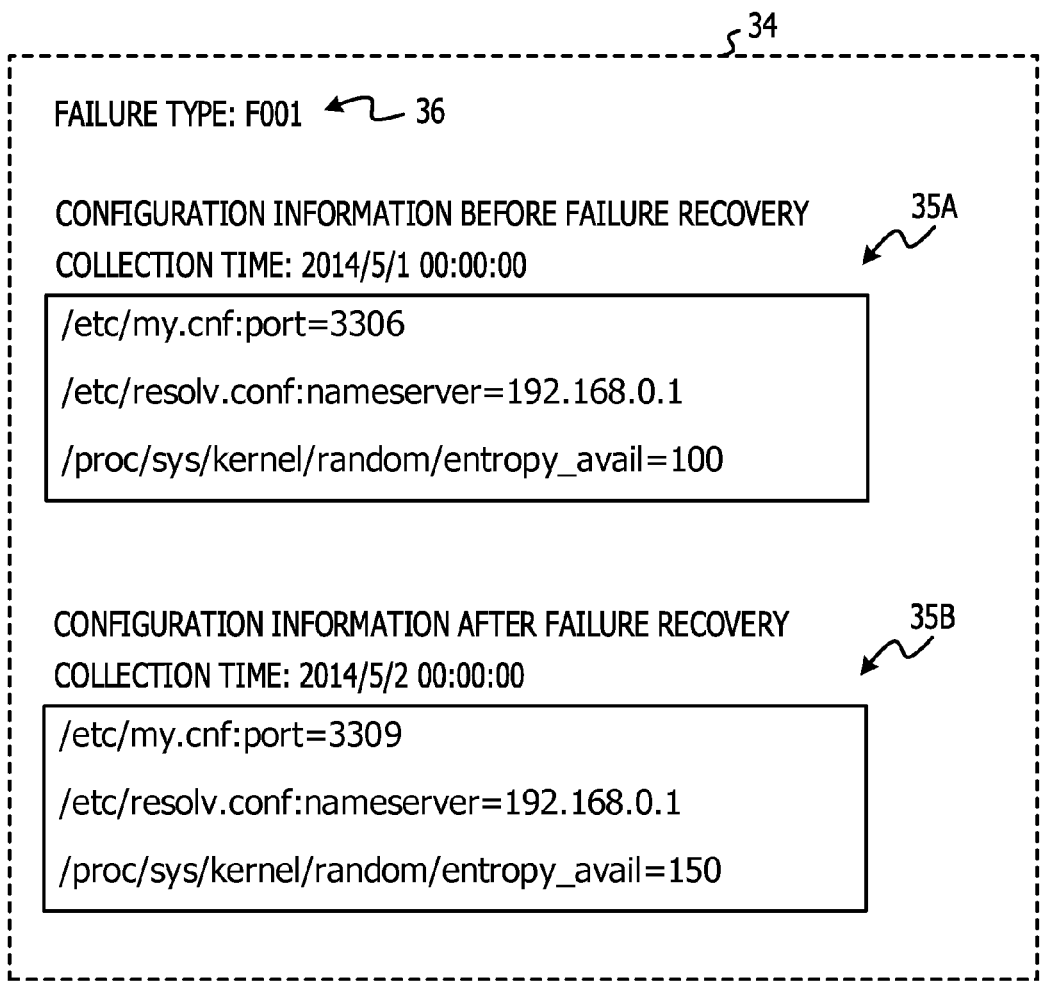
FIG. 4 is a diagram illustrating an example of case data.

FIG. 4 illustrates an example of case data 34. In the example in FIG. 4, configuration information 35A collected before a failure recovery is recorded together with its collection time. Also, configuration information 35B collected after the failure recovery is recorded together with its collection time. Further, a failure type 36, which is identification information determined for each failure type, is recorded. The failure type 36 is recorded in the case data 34 by an operator, or the like who collects the configuration information at the time of failure recovery, for example.

Figure 5:
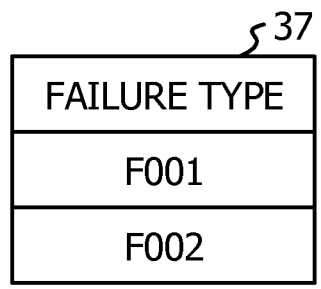
FIG. 5 is a diagram illustrating an example of a failure type list.

The pattern generation unit 21 receives a plurality of case data 34 as input, and stores the data into a predetermined storage area. Also, the pattern generation unit 21 records the failure types 36 included in the plurality of the stored case data 34, respectively in a failure type list 37 as illustrated in FIG. 5, for example. In this regard, a duplicate failure type is not recorded.

Also, the pattern generation unit 21 extracts all the keys identifying various setting items on the configuration from each of the configuration information 35A before the failure recovery, and the configuration information 35B after the failure recovery, which are included in the individual case data 34. For example, as described above, in the configuration information of a directory structure, a key is expressed by a path from a root directory to a file, and a parameter name to be set in the file. Thus, the pattern generation unit 21 extracts "/etc/my.cnf:port" as a key from the description in the first row "/etc/my.cnf:port=3306" of the configuration information 35A before the failure recovery in the case data 34 in FIG. 4, for example. The pattern generation unit 21 lists the extracted keys, and creates a key list 38 as illustrated in FIG. 6, for example.

Also, the pattern generation unit 21 generates a pattern in which a failure type, a key, and values before and after the failure recovery are associated if the values before and after the failure recovery are different for each key recorded in the key list 38. For example, in the case data in FIG. 4, for the key "/etc/my.cnf:port", the value before the failure recovery "3306" and the value after the failure recovery "3309" are different. Accordingly, the pattern, in which the failure type "F001", the key "/etc/my.cnf:port", the value before the failure recovery "3306", and the value after the failure recovery "3309" are associated, is generated. The pattern generation unit 21 records the pattern generated for each key into a pattern list 39 as illustrated in FIG. 7, for example. In the example in FIG. 7, "value $V_A$" is the value before the failure recovery, and "value $V_B$" is the value after the failure recovery.

Further, the pattern generation unit 21 deletes a pattern having the failure type and the key that match a pair of a failure type and a key predetermined in a disregard list 40 as illustrated in FIG. 8, for example from the pattern list 39. In the disregard list 40, a key by which it is difficult to find a cause and a sign of failure occurrence by comparing the values before and after the failure recovery, such as a key that changes every time a system is started, or the like, for example is predetermined for each failure type.

The learning data generation unit 22 generates learning data from each pattern recorded in the pattern list 39 generated by the pattern generation unit 21. The learning data is summary data for a certain key, which includes the number of occurrences of a certain value as a correct answer, and the number of occurrences of a certain value as an error for each failure type. The pattern recorded in the pattern list 39 includes the values before and after the failure recovery for each key. The value before the failure recovery $V_A$ is an erroneous value, and the value after the failure recovery $V_B$ is a correct value.

For example, as illustrated in FIG. 9, a plurality of learning data including items of a failure type, a key, a success or failure, a value, and the number of times are recorded in the learning data DB 31. The learning data generation unit 22 increases, by one, the number of times of the learning data having a failure type, a key, and a value that match the failure type, the key, and the value $V_A$ before the failure recovery of a certain pattern, respectively, and having a success or failure of "Failure" for one pattern. Also, the learning data generation unit 22 increases, by one, the number of times of the learning data having a failure type, a key, and a value that match the failure type, the key, and the value $V_B$ after the failure recovery of a certain pattern, respectively, and having a success or failure of "Success" for one pattern. In this regard, if the learning data having a failure type, a key, and a value that match the failure type, the key, and the value $V_A$ before the failure recovery or the value $V_B$ after the failure recovery is not recorded in the learning data DB 31, the learning data generation unit 22 adds the relevant learning data, and sets the number of times to 1.

Also, for example as illustrated in FIG. 10, the learning data generation unit 22 records the number of times $N_S$, which is the number produced by counting the number of learning data having the success or failure of "Success" for each failure type and for each key, into the count data DB 32. In the same manner, the learning data generation unit 22 records the number of times $N_F$, which is the number produced by counting the number of learning data having the success or failure of "Failure" for each failure type and for each key, into the count data DB 32.

The specific score calculation unit 23 calculates a specific score for identifying whether to use the learning data having a correct value, or an erroneous value out of the learning data when a sign of failure occurrence is detected from the newly input configuration information. The specific score represents that the higher the probability of having a same value as a value for a certain key, that is to say, the fewer the number of variations of a value for the certain key, the more probable the value is a correct answer, or an error.

For example, the specific score calculation unit 23 obtains the empirical probability of the occurrence of each value of the learning data having the success or failure of "Success" for a certain key for a certain failure type in the learning data DB 31. Then, the specific score calculation unit 23 calculates the conditional entropy from the obtained probability, and determines the conditional entropy to be a specific score $S_S$ of a correct answer indicating the probability of the learning data having the success or failure of "Success". In the same manner, the specific score calculation unit 23 calculates the conditional entropy from the empirical probability of the occurrence of each value of the learning data having the success or failure of "Failure", and determines the conditional entropy to be a specific score $S_F$ of a correct answer indicating the probability of the learning data having the success or failure of "Failure". The specific score $S_S$ is expressed by the following expression (1), and the specific score $S_F$ is expressed by the following expression (2). In this regard, $X_{Success}$ is a set of the learning data having the success or failure of "Success" for a certain key for a certain failure type, and $X_{Failure}$ is a set of the learning data having the success or failure of "Failure".

$$S_S \stackrel{def}{=} \sum_{x \in X_{Success}} -p(x \mid \text{Success})\log P(x \mid \text{Success}) \quad (1)$$

$$S_F \stackrel{def}{=} \sum_{x \in X_{Failure}} -p(x \mid \text{Failure})\log P(x \mid \text{Failure}) \quad (2)$$

More specifically, a description will be given of an example of calculating the specific score $S_S$ and the specific score $S_F$ for the failure type "F001" and the key "/etc/my.cnf:port" using the learning data DB 31 illustrated in FIG. 9, and the count data DB 32 illustrated in FIG. 10. In this case, $X_{Success}$ and $X_{Failure}$ are as follows.

$X_{Success}$={3309}
$X_{Failure}$={3306, 3307, 3308}

In this regard, the individual learning data included in the above-described sets represent values included in the learning data.

The specific score calculation unit 23 obtains the number of occurrences (three times) of the learning data of the value "3309" included in the XSuccess from the learning data DB

31. In the same manner, the specific score calculation unit 23 obtains the number of occurrences (each one time) of each learning data of the value "3306", the value "3307", and the value "3308" that are included in $X_{Failure}$ from the learning data DB 31. Also, the specific score calculation unit 23 obtains the number of occurrences $N_S$ (three times) of the learning data having the failure type "F001", the key "/etc/my.cnf:port", and the success or failure of "Success", and the number of occurrences $N_F$ (three times) of the learning data having the success or failure of "Failure" from the count data DB 32.

The specific score calculation unit 23 calculates an empirical probability for each value of the learning data using the obtained number of times as illustrated below.

p(3306|Failure)=1/3
p(3307|Failure)=1/3
p(3308|Failure)=1/3
p(3309|Success)=3/3

The specific score calculation unit 23 calculates the specific score $S_S$ and the specific score $S_F$ as follows using the calculated empirical probability by the above-described expressions (1) and (2).

$$S_S = -\frac{3}{3}\log\frac{3}{3} = 0, S_F = -3 \times \frac{3}{3}\log\frac{3}{3} = 0.48$$

The specific score calculation unit 23 calculates the specific score $S_S$ and the specific score $S_F$ for each failure type and for each key, and stores the scores in the specific score DB 33 as illustrated in FIG. 11, for example.

When the configuration information to be a target of sign detection is input, the detection unit 24 detects a sign of failure occurrence using the learning data DB 31, the count data DB 32, and the specific score DB 33 stored in the storage unit 30. Specifically, the detection unit 24 compares each detection target data represented by pairs of the key and the value included in the detection-target configuration information, and the learning data, and determines whether the value of each setting item in the configuration information is correctly set or not. If determined that the correct value is not set, the detection unit 24 detects a sign of failure occurrence, and outputs the sign detection result.

As described above, in the present embodiment, after identification of using either correct learning data or erroneous learning data is performed, sign detection is carried out. Specifically, the detection unit 24 obtains the specific score $S_S$ and the specific score $S_F$ corresponding to the key that matches a key included in the detection target data for each failure type from the specific score DB 33. The smaller the value of the specific score $S_S$ illustrated in the above-described expression (1), the higher the probability that the value of the correct learning data is a correct answer is indicated. Also, the smaller the value of the specific score $S_F$ illustrated in the above-described expression (2), the higher the probability that the value of the erroneous learning data is an error is indicated. Thus, for a failure type having the specific score $S_S$ smaller than the specific score $S_F$, the detection unit 24 identifies the correct learning data, and for a failure type having the specific score $S_F$ smaller than the specific score $S_S$, the detection unit 24 identifies the erroneous learning data.

For a failure type for which the correct learning data is identified, the detection unit 24 compares the detection target data and the correct learning data, and if they do not match, the detection unit 24 detects a sign of failure occurrence. Also, for a failure type for which erroneous learning data is identified, the detection unit 24 compares the detection target data and the erroneous learning data, and if they match, the detection unit 24 detects a sign of failure occurrence. If the detection unit 24 has detected a sign of failure occurrence, the detection unit 24 records a sign detection result in which a detection score (the details will be described later) is given to the failure type, and the detection target data (key and value) in a sign detection result list 41 as illustrated in FIG. 12, for example.

The detection score is a score indicating the probability of the sign detection result. For example, it is assumed that there are a plurality of erroneous learning data having the same key as the key of the detection target data for a failure type, and the value of the detection target data matches any one of the erroneous learning data. In this case, the higher is the number of occurrences of the erroneous learning data that have matched the value of the detection target data, the higher the probability that the value is an error becomes. Thus, it is possible for the detection unit 24 to determine a value produced by dividing the number of occurrences N of the erroneous learning data that has matched the value of the detection target data by the number of occurrences $N_F$ of the erroneous learning data having the same failure type and key, for example to be a detection score. In this regard, it is possible to obtain the number of occurrences N from the learning data DB 31, and to obtain the number of occurrences $N_F$ from the count data DB 32.

Also, if the value of the correct learning data having the same key as the key of the detection target data does not match the value of the detection target data for a certain failure type, it is not possible to calculate a detection score based on the number of occurrences as described above. Thus, the detection unit 24 gives a value (for example, "−1") indicating that there has been no match with the correct learning data as the detection score unlike the detection score based on the number of occurrences described above.

Figure 13:
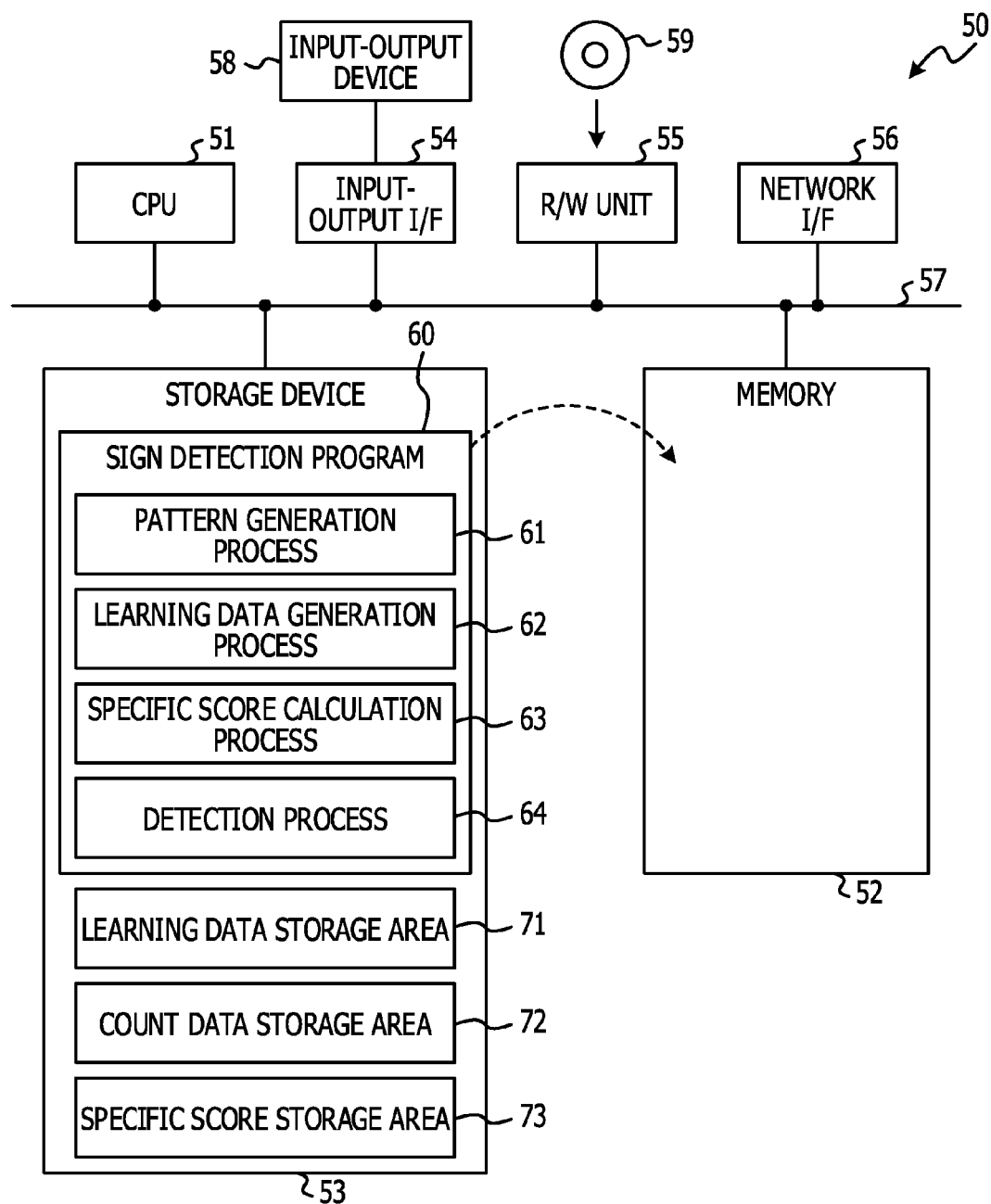
FIG. 13 is a hardware configuration diagram of a computer that functions as the sign detection apparatus according to the present embodiment.

It is possible to achieve the sign detection apparatus 10 by a computer 50 illustrated in FIG. 13, for example. The computer 50 includes a CPU 51, a memory 52 as a temporary storage area, and a nonvolatile storage device 53. Also, the computer 50 includes an input-output interface (I/F) 54 to which an input-output device 58 is connected. Also, the computer 50 includes a read/write (R/W) unit 55, which controls reading and writing data from and to a recording medium 59, and a network I/F 56 through which a network 12, such as the Internet, or the like is connected. The CPU 51, the memory 52, the storage device 53, the input-output I/F 54, the R/W unit 55, and the network I/F 56 are mutually connected through a bus 57.

It is possible to achieve the storage device 53 by a hard disk drive (HDD), a solid state drive (SSD), a flash memory, or the like. The storage device 53, as a storage medium, stores a sign detection program 60 for causing the computer 50 to function as a sign detection apparatus 10. Also, the storage device 53 includes a learning data storage area 71 for storing learning data, a count data storage area 72 for storing count data, and a specific score storage area 73 for storing a specific score.

The CPU 51 reads the sign detection program 60 from the storage device 53, loads the program into the memory 52, and executes the processes of the sign detection program 60 in sequence. Also, the CPU 51 reads the learning data stored in the learning data storage area 71, and loads the data into the memory 52 as the learning data DB 31. Also, the CPU 51 reads the count data stored in the count data storage area 72, and loads the data into the memory 52 as the count data DB 32. Also, the CPU 51 reads the specific score stored in the specific score storage area 73, and loads the score into the memory 52 as the specific score DB 33. Further, the CPU 51 creates the above-described failure list 37, key list 38, pattern list 39, and sign detection result list 41 in the memory 52 during the execution of the sign detection program 60.

The sign detection program 60 includes a pattern generation process 61, a learning data generation process 62, a specific score calculation process 63, and a detection process 64.

The CPU 51 executes the pattern generation process 61 so as to operate as the pattern generation unit 21 illustrated in FIG. 2. Also, the CPU 51 executes the learning data generation process 62 so as to operate as the learning data generation unit 22 illustrated in FIG. 2. Also, the CPU 51 executes the specific score calculation process 63 so as to operate as the specific score calculation unit 23 illustrated in FIG. 2. Also, the CPU 51 executes the detection process 64 so as to operate as the detection unit 24 illustrated in FIG. 2. Thereby, the computer 50 executing the sign detection program 60 functions as the sign detection apparatus 10.

In this regard, it is possible to achieve the sign detection apparatus 10 by a semiconductor integrated circuit, more specifically by an application specific integrated circuit (ASIC), or the like, for example.

Figure 14:
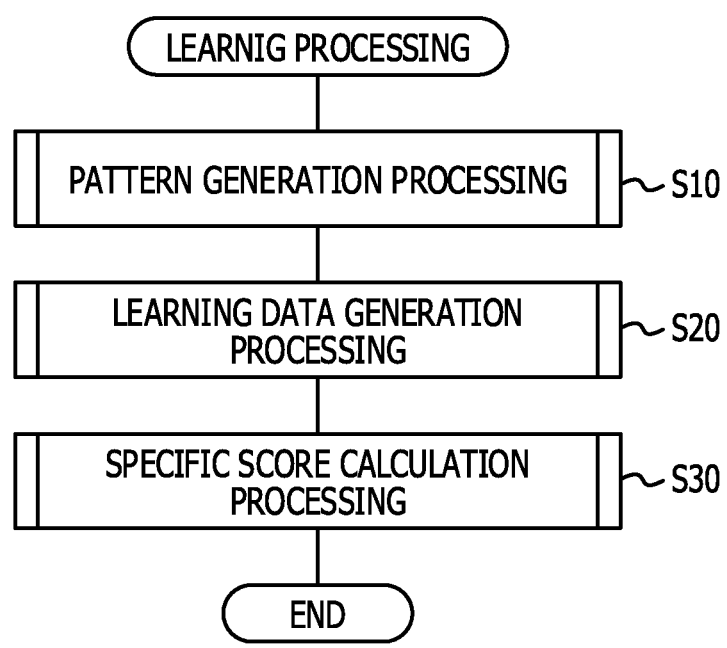
FIG. 14 is a flowchart illustrating an example of learning processing.
Figure 18:
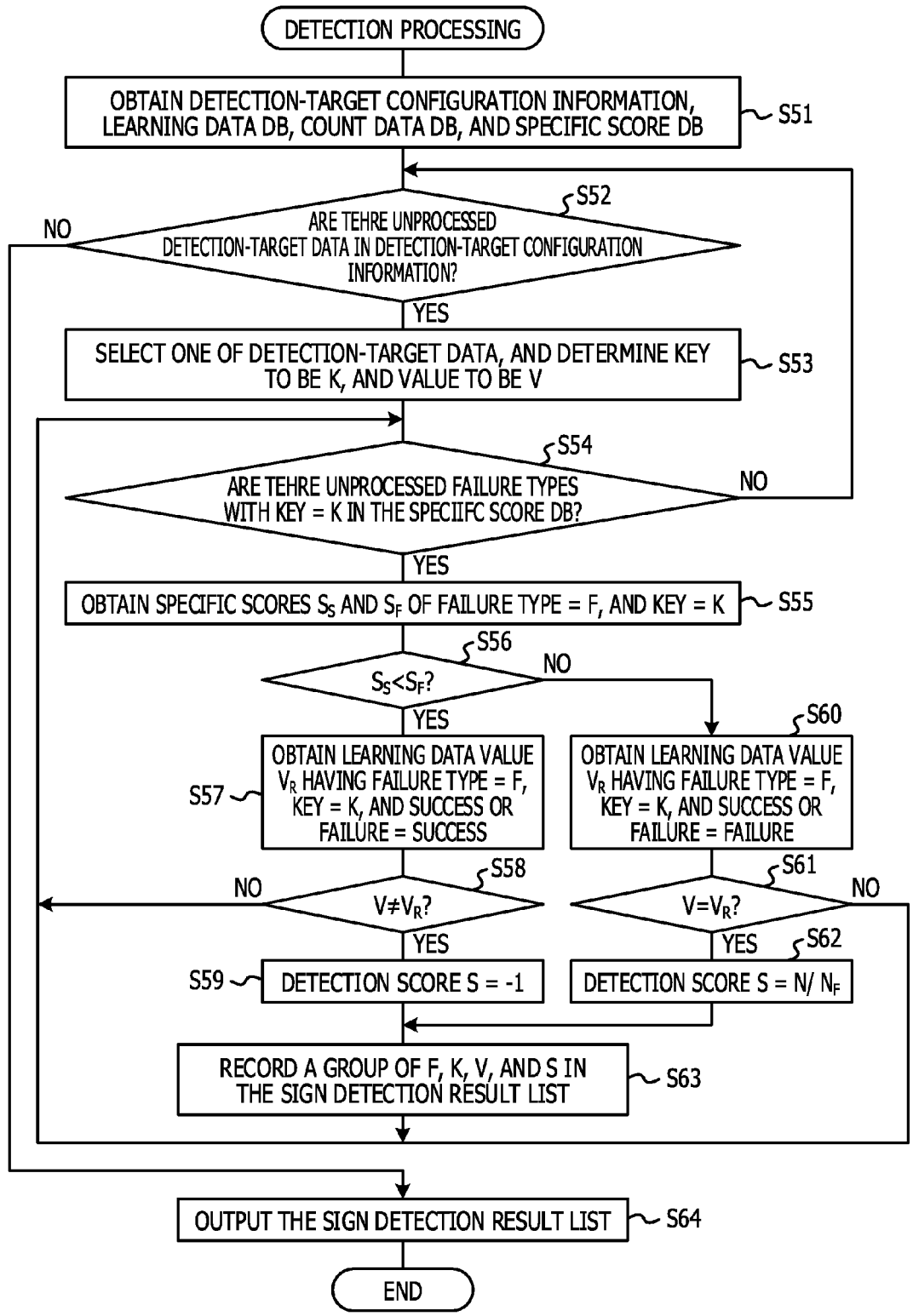
FIG. 18 is a flowchart illustrating an example of detection processing.

Next, a description will be given of operation of the sign detection apparatus 10 according to the present embodiment. First, when a plurality of case data 34 is input into the sign detection apparatus 10, learning processing illustrated in FIG. 14 is executed in the sign detection apparatus 10, and the learning data DB 31, the count data DB 32, and the specific score DB 33 are stored in the storage unit 30. In this state, when detection-target configuration information is input into the sign detection apparatus 10, detection processing illustrated in FIG. 18 is executed in the sign detection apparatus 10, and the sign detection result list 41 is output. In this regard, the learning processing and the detection processing that are executed by the sign detection apparatus 10 exemplify a sign detection method according to the present disclosure. In the following, a detailed description will be given of each processing.

Figure 15:
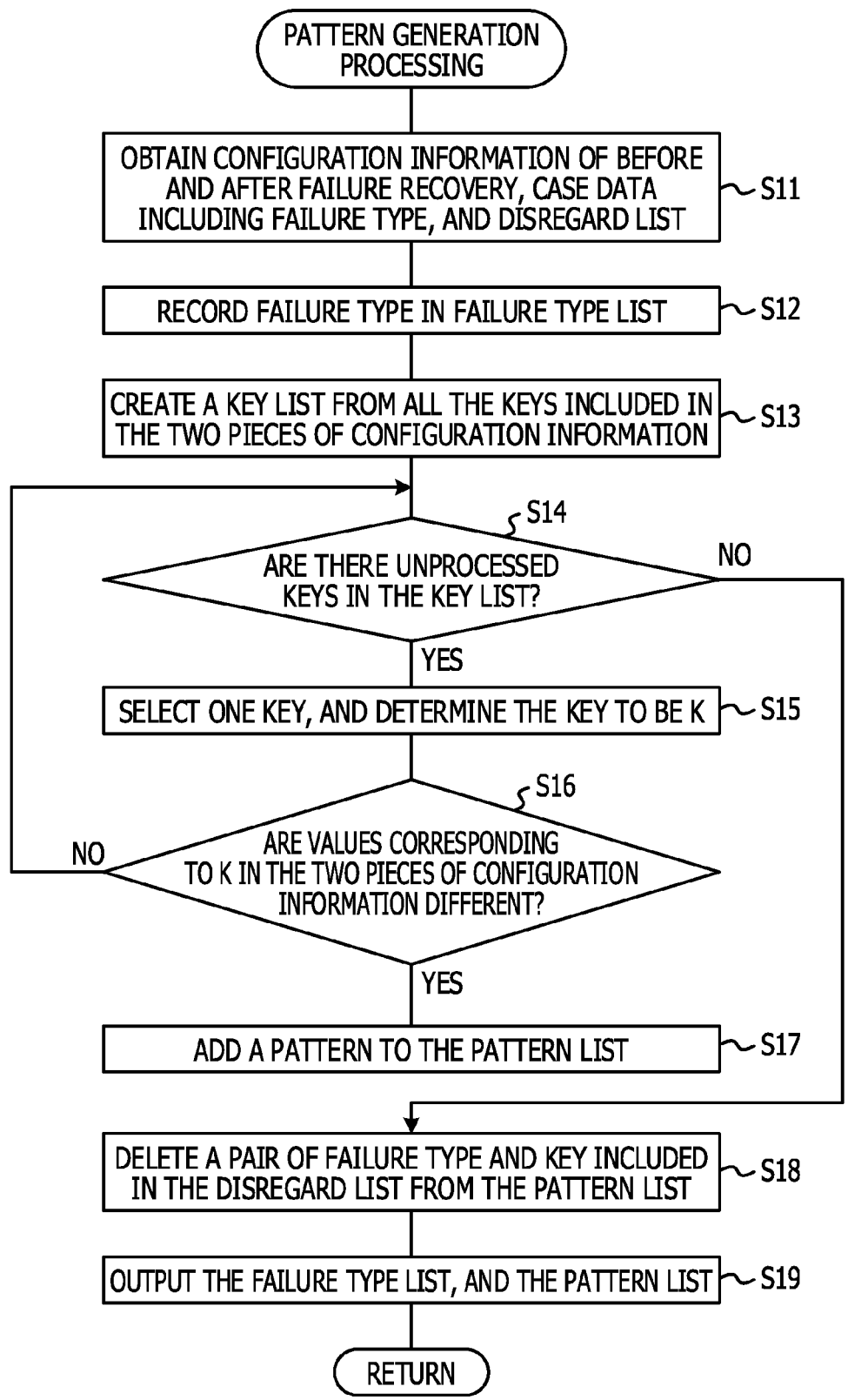
FIG. 15 is a flowchart illustrating an example of pattern generation processing.

In step S10 of the learning processing illustrated in FIG. 14, the pattern generation unit 21 executes pattern generation processing the details of which are illustrated in FIG. 15.

In step S11 of the pattern generation processing illustrated in FIG. 15, the pattern generation unit 21 obtains one piece of the case data 34 from a plurality of input case data 34. The case data 34 includes the configuration information 35A before the failure recovery, the configuration information 35B after the failure recovery, and the failure type 36. Also, the pattern generation unit 21 obtains the disregard list 40 stored in a predetermined area (omitted in illustration).

Next, in step S12, the pattern generation unit 21 records the failure type 36 illustrated in the obtained case data 34 into the failure type list 37 as illustrated in FIG. 5, for example.

Next, in step S13, the pattern generation unit 21 extracts all the keys from the configuration information 35A before the failure recovery, and the configuration information 35B after the failure recovery, which are included in the obtained case data 34, and creates the key list 38 as illustrated in FIG. 6, for example.

Next, in step S14, the pattern generation unit 21 determines whether there are keys for which the processing in step S15 to S17 has not been performed in the key list 38 or not. If there are unprocessed keys, the processing proceeds to step S15, the pattern generation unit 21 selects one from the unprocessed keys, and determines it to be a key K.

Next, in step S16, the pattern generation unit 21 obtains the values before and after the failure recovery corresponding to the key K from the configuration information 35A before the failure recovery, and the configuration information 35B after the failure recovery, respectively. Then, the pattern generation unit 21 determines whether the obtained values before and after the failure recovery are different or not. If they are different, the processing proceeds to step S17, and if they are equal, the processing returns to step S14.

In step S17, the pattern generation unit 21 generates a pattern in which the failure type included in the case data 34 obtained in step S11, the key K, and the value before the failure recovery $V_A$, and the value after the failure recovery $V_B$, which are corresponding to the key K, are associated. Then, the pattern generation unit 21 adds the generated pattern to the pattern list 39 as illustrated in FIG. 7, for example.

If determined that there are no unprocessed keys in step S14 described above, the processing proceeds to step S18. In step S18, the pattern generation unit 21 deletes a pattern including a failure type and a key that match the predetermined pair of the failure type and the key in the disregard list 40 obtained in step S11 from the pattern list 39.

Next, in step S19, the pattern generation unit 21 outputs the generated failure type list 37, and pattern list 39. If the pattern generation processing for all the input case data 34 is completed, the processing returns to the learning processing illustrated in FIG. 14.

Figure 16:
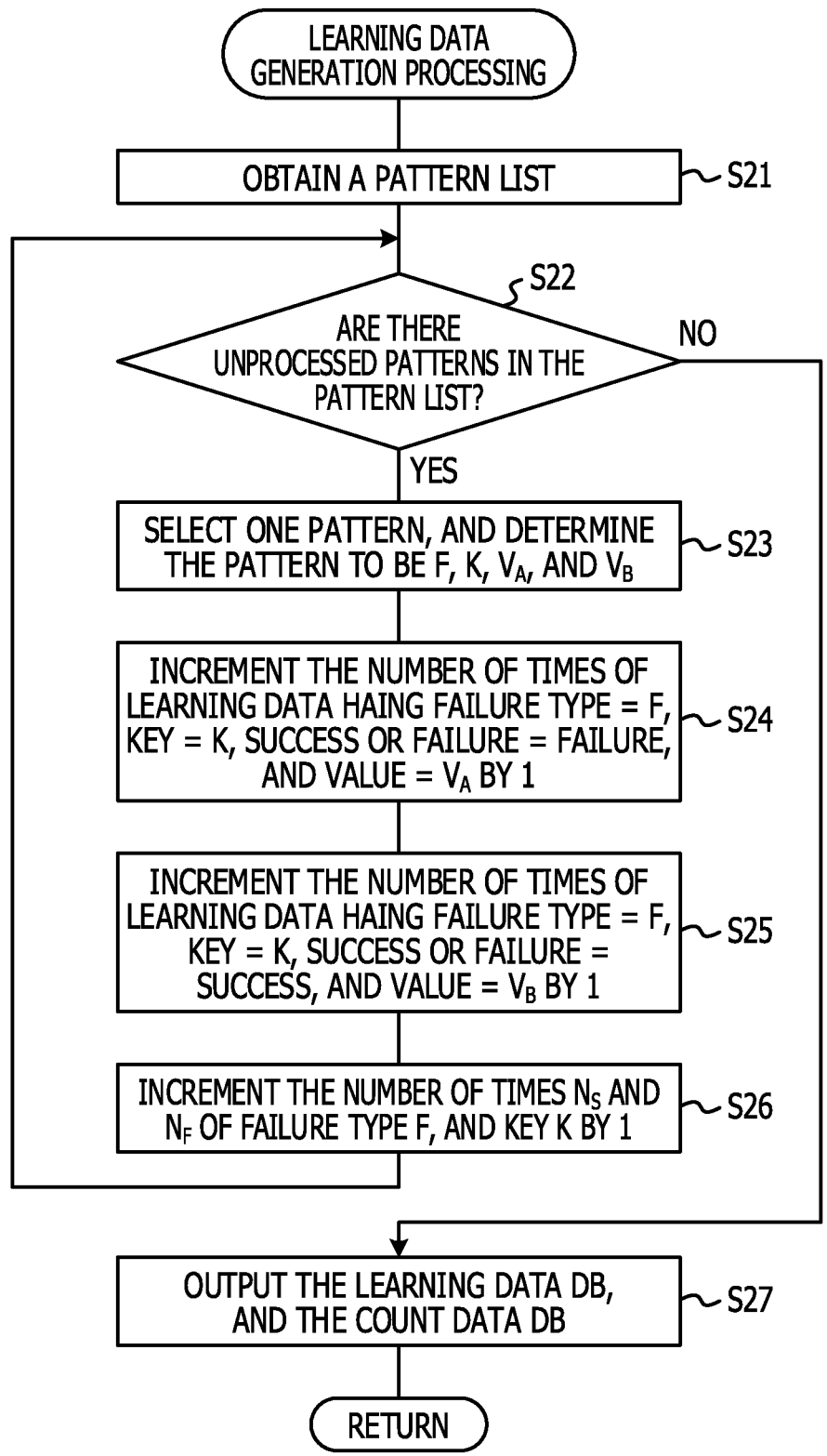
FIG. 16 is a flowchart illustrating an example of learning data generation processing.

Next, in step S20 of the learning processing illustrated in FIG. 14, the learning data generation unit 22 executes the learning data generation processing the details of which are illustrated in FIG. 16.

In step S21 of the learning data generation processing illustrated in FIG. 16, the learning data generation unit 22 obtains the pattern list 39 output from the pattern generation unit 21.

Next, in step S22, the learning data generation unit 22 determines whether there are patterns for which the following processing in step S23 to S26 has not been performed in the pattern list 39 or not. If there are unprocessed patterns, the processing proceeds to step S23. In step S23, the learning data generation unit 22 selects one pattern from the unprocessed patterns, and determines that the failure type included in the pattern to be F, the key to be K, the value before the failure recovery to be $V_A$, and the value after the failure recovery to be $V_B$.

Next, in step S24, the learning data generation unit 22 increases the number of times of the learning data having the failure type of F, the key of K, the value of $V_A$, and the success or failure of "Failure" by one in the learning data DB 31 as illustrated in FIG. 9, for example. Next, in step S25, the learning data generation unit 22 increases the number of times of the learning data having the failure type of F, the key of K, the value of $V_B$, and the success or failure of "Success" by one in the learning data DB 31. In this regard, in step S24 and S25, if the relevant learning data is not recorded in the learning data DB 31, the learning data generation unit 22 adds the relevant learning data, and then sets the number of times to 1.

Next, in step S26, the learning data generation unit 22 increases the count data ($N_S$ and $N_F$) having the failure type of F, and the key of K by one, respectively in the count data DB 32 as illustrated in FIG. 10, for example, and the processing returns to step S22. In this regard, if the relevant count data is not recorded in the count data DB 32, the learning data generation unit 22 adds the relevant count data, and then individually sets $N_S$ and $N_F$ to 1.

In step S22, if determined that there are no unprocessed, the processing proceeds to step S27, the learning data generation unit 22 outputs the learning data DB 31 and the count data DB 32, and the processing returns to the learning processing illustrated in FIG. 14.

Figure 17:
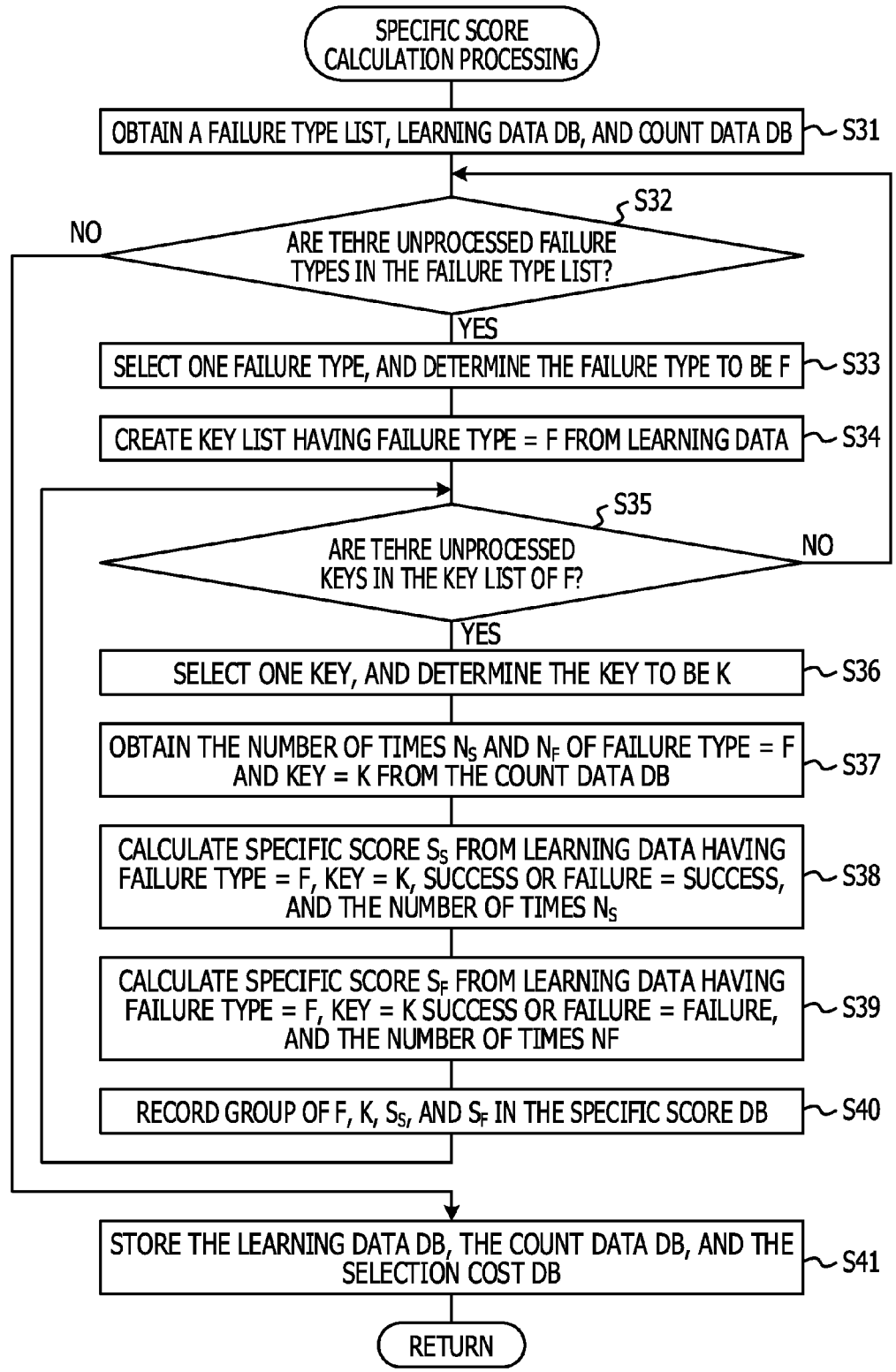
FIG. 17 is a flowchart illustrating an example of specific score calculation processing.

Next, in step S30 of the learning processing illustrated in FIG. 14, the specific score calculation unit 23 executes the specific score calculation processing the details of which are illustrated in FIG. 17.

In step S31 of the specific score calculation processing illustrated in FIG. 17, the specific score calculation unit 23 obtains the failure type list 37 output from the pattern generation unit 21, and the learning data DB 31 and the count data DB 32, which are output from the learning data generation unit 22.

Next, in step S32, the specific score calculation unit 23 determines whether there are failure types for which the following processing in step S33 to S40 has not been performed in the failure type list 37. If there are unprocessed failure types, the processing proceeds to step S33, and the specific score calculation unit 23 selects one failure type from the unprocessed failure types, and determines it to be the failure type F.

Next, in step S34, the specific score calculation unit 23 extracts all the keys included in the learning data having the failure type of F out of the learning data recorded in the learning data DB 31, and creates the key list of F. Next, in step S35, the specific score calculation unit 23 determines whether there are keys for which the following processing in step S36 to S40 has not been performed in the key list of F. If there are unprocessed keys, the processing proceeds to step S36, the specific score calculation unit 23 selects one key from the unprocessed keys, and determines the key to be K.

Next, in step S37, the specific score calculation unit 23 obtains the count data ($N_S$ and $N_F$) having the failure type of F, and the key of K from the count data DB 32.

Next, in step S38, the specific score calculation unit 23 obtains the number of times of the learning data having the failure type of F, the key of K, and the success or failure of "Success" for each value of the learning data from the learning data DB 31. Then, the specific score calculation unit 23 obtains an empirical probability for each value using the number of times $N_S$ obtained in step S37, and the number of times obtained from the learning data, and calculates the specific score $S_S$ of the correct answer by the expression (1), for example.

Next, in step S39, the specific score calculation unit 23 obtains the number of times of the learning data having the failure type of F, the key of K, and the success or failure of "Failure" for each value of the learning data from the learning data DB 31. Then, the specific score calculation unit 23 obtains an empirical probability for each value using the number of times $N_F$ obtained in step S37, and the number of times obtained from the learning data, and calculates the specific score $S_F$ of the error by the expression (2), for example.

Next, in step S40, the specific score calculation unit 23 records a group of the failure type of F, the key of K, the specific score of $S_S$, and the specific score of $S_F$ in the specific score DB 33 as illustrated in FIG. 11, for example, and the processing returns to step S35.

In step S35, if determined that there are no unprocessed keys, the processing returns to step S32. In step S32, if determined that there are no unprocessed failure types, the processing proceeds to step S41.

In step S41, the specific score calculation unit 23 stores the learning data DB 31, the count data DB 32, and the specific score DB 33 into the storage unit 30, then the processing returns to FIG. 14, and the learning processing is terminated.

Next, in step S51 of the detection processing illustrated in FIG. 18, the detection unit 24 obtains the input detection-target configuration information. Also, the detection unit 24 obtains the learning data DB 31, the count data DB 32, and the specific score DB 33 stored in the storage unit 30.

Next, in step S52, the detection unit 24 determines whether there are detection target data for which the processing of the following step S53 to S63 has not been performed out of the detection target data represented by a pair of the key and the value included in the detection-target configuration information. If there are unprocessed detection target data, the processing proceeds to step S53, the detection unit 24 selects one of the unprocessed detection target data, and determines the key to be K included in the selected detection target data, and the value to be V.

Next, in step S54, the detection unit 24 determines whether there are failure types for which the processing of the following step S55 to S63 has been performed out of the failure types recorded in the specific score DB 33 correspondingly to the key K. If there are unprocessed failure types, the processing proceeds to step S55, the detection unit 24 selects one failure type from the unprocessed failure types to determine it to be F, and obtains the specific score $S_S$ and the specific score $S_F$ corresponding to the failure type of F, and the key of K from the specific score DB 33.

Next, in step S56, the detection unit 24 compares the specific score $S_S$ and the specific score $S_F$, and determines if $S_S < S_F$ or not. As described above, the lower the value of the specific score $S_S$ expressed in the (1) expression, the higher the probability that the value of the correct learning data is the correct answer is represented. Also, the lower the value of the specific score $S_F$ expressed in the (2) expression, the higher the probability that the value of the erroneous learning data is an error is represented. Accordingly, if $S_S < S_F$, it is possible to conduct sign detection more suitably using the correct learning data, whereas if $S_S > S_F$, it is possible to conduct sign detection more suitably using the erroneous learning data. If $S_S = S_F$, either learning data may be used. However, in the present embodiment, it is assumed to use the erroneous learning data. If $S_S < S_F$, the processing proceeds to step S57, and if $S_S$ $S_F$, the processing proceeds to step S60.

In step S57, the detection unit 24 obtains the value of the learning data having the failure type of F, the key of K, and the success or failure of "Success" from the learning data DB 31, and determines the value to be $V_R$. Next, in step S58, the detection unit 24 determines whether the value V of the detection target data matches the value $V_R$ of the obtained learning data. If $V = V_R$, it indicates that the correct value is set in the value V of the detection target data, and thus the processing directly returns to step S54. If $V \neq V_R$, the processing proceeds to step S59, and the detection unit 24 sets a value "−1" in the detection score S, which indicates that the value of the detection target data has not matched the correct learning data, and the processing proceeds to step S63.

On the other hand, in step S60, the detection unit 24 obtains the value of the learning data having the failure type of F, the key of K, and the success or failure of "Failure" from the learning data DB 31, and determines the value to be $V_R$. Next, in step S61, the detection unit 24 determines whether the value V of the detection target data matches the value $V_R$ of the obtained learning data. If $V \neq V_R$, an erroneous value is not said to be set in the value V of the detection target data, and thus the processing directly returns to step S54. If $V=V_R$, the processing proceeds to step S62. In step S62, the detection unit 24 obtains the number of occurrences N of the erroneous learning data having the failure type of F, the key of K, and the value of $V_R$ from the learning data DB 31. Also, the detection unit 24 obtains the number of occurrences $N_F$ of the erroneous learning data having the failure type of F, and the key of K from the count data DB 32. Then, the detection unit 24 sets the detection score S to $N/N_F$, and the processing proceeds to step S63.

In step S63, the detection unit 24 records a group of the failure type of F, the key of K, the value of V, and the detection score of S into the sign detection result list 41 as illustrated in FIG. 12 as a result of the sign detection, for example, and the processing returns to step S54. In step S54, if determined that there are no unprocessed failure types, the processing returns to step S52. In step S52, if determined that there are no unprocessed detection target data, the processing proceeds to step S64.

In step S64, the detection unit 24 outputs the sign detection result list 41, and the detection processing is terminated.

In this regard, if a plurality of values $V_R$ are obtained in step S57, and if determined that the value V of the detection target data does not match any one of the values $V_R$ in step S58, the processing ought to proceed to step S59.

Also, if a plurality of values $V_R$ are obtained in step S60, and if determined that the value V of the detection target data matches any one of the values $V_R$ in step S61, the processing ought to proceed to step S62. Also, the threshold value $S_{th}$ for the detection score S may be set in advance, and only the sign detection result having a relationship $S>S_{th}$ may be added to the sign detection result list 41. Thereby, it is possible to include only the case of having a high probability of a sign of failure occurrence in the sign detection result list 41. Also, a different value for each failure type and for each key may be set to the threshold value $S_{th}$.

As described above, with the present embodiment, learning data is generated from each piece of the configuration information obtained before and after a failure recovery, a comparison is made between the learning data, and the detection target data included in the detection-target configuration information, and a determination is made whether a correct value is set in each setting item or not. Thereby, it is possible to detect a sign of failure occurrence caused by omission of changing a setting value, which is not possible to be detected by a method of detecting a part having different values between before and after a change in the configuration information, and analyzing whether that part might cause the failure.

Also, with the present embodiment, learning data having a higher probability as a correct answer, or an error is used out of correct learning data and erroneous learning data. Thereby, it is possible to suitably detect a sign of failure occurrence caused by both an error in changing a setting value, and omission of changing a setting value.

In this regard, in the above-described embodiments, it is assumed that each time a failure occurs in the processing apparatus 16, the configuration information is collected both before and after the recovery of the failure. Accordingly, it is assumed that the pieces of the configuration information 35A and 35B included in the input case data 34 are identified as the configuration information of before and after the failure recovery.

However, the configuration information is sometimes collected at periodic timing (for example, once a day), or is sometimes collected at any timing regardless of a failure recovery. If the configuration information collected at such timing is input, the configuration information whose collection time is included in a predetermined period as a period before the failure recovery is identified as the configuration information 35A before the failure recovery. In the same manner, the configuration information whose collection time is included in a predetermined period as a period after the failure recovery is identified as the configuration information 35B after the failure recovery. Then, the configuration information 35A before the failure recovery, and the configuration information 35B after the failure recovery, which were collected in the predetermined periods corresponding to the periods before and after the failure recovery, respectively ought to be formed into a pair, and a pattern ought to be generated for a setting item whose value has been changed.

For example, the configuration information that is collected during operation other than failure recovery operation sometimes includes a setting item in which a value that is not originally a correct answer, or a value unrelated with the failure recovery is set. If learning data is generated from such configuration information, unsuitable learning data is generated as a correct answer or erroneous learning data. Accordingly, the "predetermined period" for identifying periods before and after the failure recovery is determined to be a period excluding an operation period unrelated with the failure recovery operation.

Also, in the above-described embodiments, a description has been given of the case including a failure type, a key, a value, and a detection score in a sign detection result. However, a correct value may be added to the sign detection result. Specifically, in the case where sign detection is conducted using correct learning data, it is possible to add a value of correct learning data as a correct value. Also, in the case where sign detection is conducted using erroneous learning data, it is possible to add a value of the learning data having the same failure type and key as those of the learning data, and the success or failure of "Success" as a correct value.

Also, in the above, a description has been given of the mode in which the sign detection program 60, which is an example of a sign detection program according to the present disclosure, is stored (installed) in the storage device 53. However, the present disclosure is not limited to this. It is possible to provide a sign detection program according to the disclosed technique in a form of the sign detection program recorded in a recording medium, such as a CD-ROM, a DVD-ROM, a USB memory, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented method for detecting a failure occurrence within a system including an information processing device, the method comprising:

each time when a failure occurs, acquiring a plurality of case data by receiving a case data including first configuration information before recovering from the failure and second configuration information after recovering from the failure and a type of the failure, the first configuration information and the second configuration information respectively including a plurality of setting values respectively corresponding to a plurality of setting items;

extracting, from among the plurality of setting items, one or more setting storing a setting value changed while recovering from a target failure, by referring to the type of the failure and comparing the plurality of setting values included in the first configuration information with the plurality of setting values included in the second configuration information, for each of the plurality of case data;

selecting, for each of the extracted one or more setting items, a first setting value included in the first configuration information or a second setting value included in the second configuration information as information to be referred to for detecting an occurrence of the target failure, based on appearance probabilities of the first setting value and the second setting value;

detecting a sign of occurrence of the target failure based on a result of the selecting when new configuration information including a setting value corresponding to each of the plurality of setting items is received; and outputting a result of the detecting.

2. The determination method according to claim 1, wherein the selecting includes:

calculating a specific score indicating a probability of becoming information to be referred to for detecting the occurrence of the target failure using the appearance probability, for each of the one or more setting items of the first configuration information and the one or more setting items of the second configuration information, and selecting the one or more setting items of the first configuration information or the one or more setting items of the second configuration information based on the calculated specific scores.

3. The determination method according to claim 2, wherein the specific score corresponding to the first configuration information is a conditional entropy of the first setting value calculated using the appearance probabilities of the first setting value, and the specific score corresponding to the second configuration information is a conditional entropy of the second setting value calculated using the appearance probabilities of the second setting value.

4. The determination method according to claim 1, wherein the detecting includes:

comparing detection target data included in the new configuration information with the first setting value when the first setting value is selected by the selecting, detecting the sign of occurrence of the target failure, when the first setting value is correct learning data and when the new configuration information does not match with the first setting value, and detecting the sign of occurrence of the target failure, when the first setting value is erroneous learning data and when the new configuration information matches with the first setting value.

5. The determination method according to claim 1, further comprising:

calculating a detection score indicating a probability of the result of the detecting by dividing a number of occurrences of the erroneous learning data that has matched the detection target data by a total number of occurrences of the erroneous learning data, when the sign of occurrence of the target failure is detected, and recording a sign detection result in which the calculated detection score is given to a type of the target failure and the detection target data in a memory.

6. The determination method according to claim 5, further comprising:

determining a value indicating that there has been no match with the correct learning data as the detection score, when the sign of occurrence of the target failure is detected and when the detection target data does not match with the correct learning data.

7. A determination device for detecting a failure occurrence within a system, the determination device comprising:

a memory; and a processor coupled to the memory and configured to:

each time when a failure occurs, acquire a plurality of case data by receiving a case data including first configuration information before recovering from the failure, second configuration information after recovering from the failure and a type of the failure, the first configuration information and the second configuration information respectively including a plurality of setting values respectively corresponding to a plurality of setting items, extract, from among the plurality of setting items, one or more setting items respectively storing a setting value changed while recovering from a target failure, by referring to the type of the failure and comparing the plurality of setting values included in the first configuration information with the plurality of setting values included in the second configuration information, for each of the plurality of case data, select, for each of the extracted one or more setting items, a first setting value included in the first configuration information or a second setting value included in the second configuration information as information to be referred to for detecting an occurrence of the target failure, based on appearance probabilities of the first setting value and the second setting value, detect a sign of occurrence of the target failure based on a result of the selecting when new configuration information including a setting value corresponding to each of the plurality of setting items is received, and output a result of the detecting.

8. The determination device according to claim 7, wherein the processor is configured to:

calculate a specific score indicating a probability of becoming information to be referred to for detecting the occurrence of the target failure using the appearance probability, for each of the one or more setting items of the first configuration information and the one or more setting items of the second configuration information, and select the one or more setting items of the first configuration information or the one or more setting items of the second configuration information based on the calculated specific scores.

9. The determination device according to claim 8, wherein
the specific score corresponding to the first configuration information is a conditional entropy of the first setting value calculated using the appearance probabilities of the first setting value, and the specific score corresponding to the second configuration information is a conditional entropy of the second setting value calculated using the appearance probabilities of the second setting value.

10. The determination device according to claim 7, wherein the processor is configured to:

detect the sign of the occurrence of the target failure, when the first setting value is correct learning data and when the new configuration information does not match with the first setting value, and detect the sign of the occurrence of the target failure, when the first setting value is erroneous learning data and when the new configuration information matches with the first setting value.

11. The determination device according to claim 7, wherein the processor is configured to:

calculate a detection score indicating a probability of the result of the detecting by dividing a number of occurrence of the erroneous learning data that has matched the detection target data by a total number of occurrences of the erroneous learning data, when the sign of the occurrence of the target failure is detected, and record a sign detection result in which the calculated detection score is given to a type of the target failure and the detection target data in a memory.

12. The determination device according to claim 11, wherein the processor is configured to determine a value indicating that there has been no match with the correct learning data as the detection score, when the sign of the occurrence of the target failure is detected and when the detection target data does not match with the correct learning data.

* * * * *